Oct. 17, 1967 J. F. HOLMES 3,348,151

DC POWER SUPPLY AND AMPLITUDE MODULATOR

Filed March 8, 1965 2 Sheets-Sheet 1

INVENTOR.
JAMES F. HOLMES

BY Orland M. Christensen

ATTORNEY

DC POWER SUPPLY AND AMPLITUDE MODULATOR

Filed March 8, 1965 2 Sheets-Sheet 2

INVENTOR.
JAMES F. HOLMES
BY
Orland M. Christensen
ATTORNEY

United States Patent Office 3,348,151

Patented Oct. 17, 1967

3,348,151

DC POWER SUPPLY AND AMPLITUDE MODULATOR

James F. Holmes, Bellevue, Wash., assignor to The Boeing Company, Seattle, Wash., a corporation of Delaware Filed Mar. 8, 1965, Ser. No. 437,931
9 Claims. (Cl. 325—185)

Figure 1:
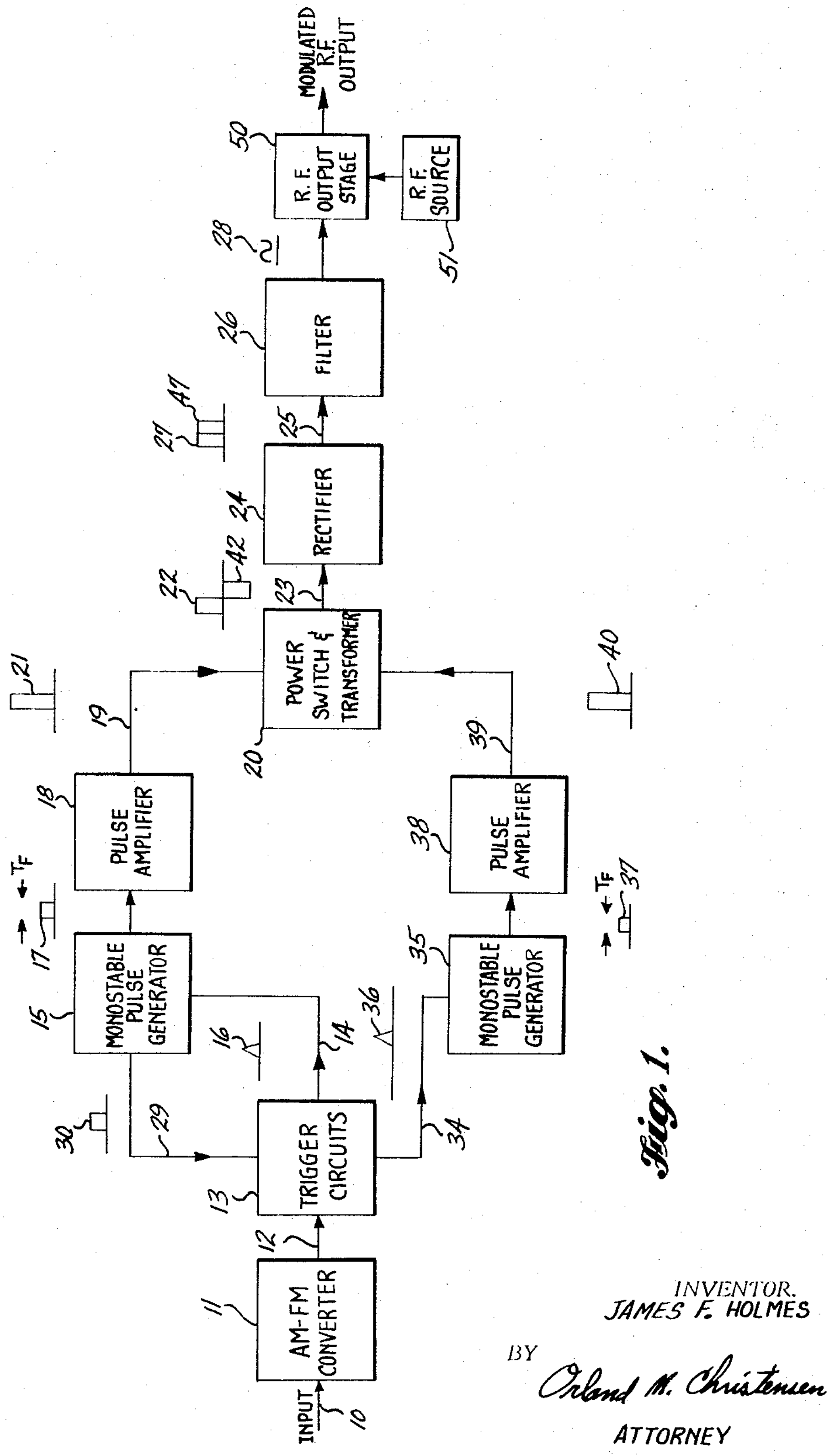

The present invention relates to radio frequency transmitters and more particularly to an improved radio frequency transmitter which includes a combination power supply and amplitude modulator which eliminates the need for a conventional power supply in the output stage of a radio frequency transmitter.

The many and varied uses for a high-power, efficient, amplitude modulated radio frequency transmitter are well known at the present time. In various types of airborne radio transmitting equipment the efficiency and associated physical size of the transmitter becomes of increasing importance. In general, it is advantageous to utilize a system requiring a minimum of space and weight and yet capable of effective and reliable transmission. Class C power amplifiers using high-level plate modulation are often used in such systems in order to achieve high efficiency, but when such a modulation system is used, it is found that the desirable minimum space and weight factors are not achieved. One of the reasons for increased weight and space in such systems is that caused by the power supply required for a high-level plate modulated Class C power amplifier.

It is therefore an object of the present invention to provide an improved and simplified radio frequency transmitter.

Another object of the present invention is to provide an improved radio frequency transmitter which makes use of a combined power supply and modulator for the final output stages thereof.

Another object of the present invention is to provide a compact radio transmitter wherein the operating power for the output radio frequency stage is provided by the output voltage from a filter network to which a modulated pulse train is applied.

Another object of the present invention is to provide an improved radio transmitter making use of high-power pulse techniques for obtaining modulation information for an output RF stage and for simultaneously providing the necessary electrical energy for operation of the output stage.

An additional object of the present invention is to provide a compact radio transmitter having a high-power output stage and wherein the input operating power for the output stage is that provided by the modulation information signal applied thereto.

These and other objects and advantages of the present invention are achieved through the use of an improved system wherein a frequency modulated signal is applied to a pulse generation or trigger circuit which then serves to control a mono-stable multivibrator or pulse generator adapted to generate an output pulse of fixed time duration. The fixed time duration pulse from the mono-stable circuit is amplified by a suitable pulse amplifier operating essentially as an on-off switch. A suitable power switching device such as a transformer coupled to the pulse amplifier then provides output signals which are rectified and filtered so that a fluctuating DC signal is obtained having sufficient power for simultaneously driving a final RF stage and applying the desired modulation information thereto.

In accordance with one preferred embodiment of the invention, a second mono-stable circuit and second pulse amplifier are utilized for driving the power switch or transformer so that a balanced asymmetrical wave is applied to the transformer primary. In those applications where an amplitude modulated signal is initially provided for application to the radio transmitting system an amplitude-to-frequency converter is utilized between the amplitude modulated signal input and the first trigger circuit which serves to control the mono-stable multivibrators.

By making use of simplified pulse amplification techniques in combination with a rectifier and filter network on the output side of the pulse amplification system, a high power amplitude modulated output signal is obtained having sufficient power for driving a high-power radio frequency output stage to which a suitable high-frequency carrier signal is simultaneously applied. Thus, the improved system effectively synthesizes the desired plate voltage for a high-power Class C amplifier directly without the need for a conventional modulation amplifier, modulation transformer, direct current power supply, and driver for the modulation amplifier as previously utilized in the art.

Figure 2:
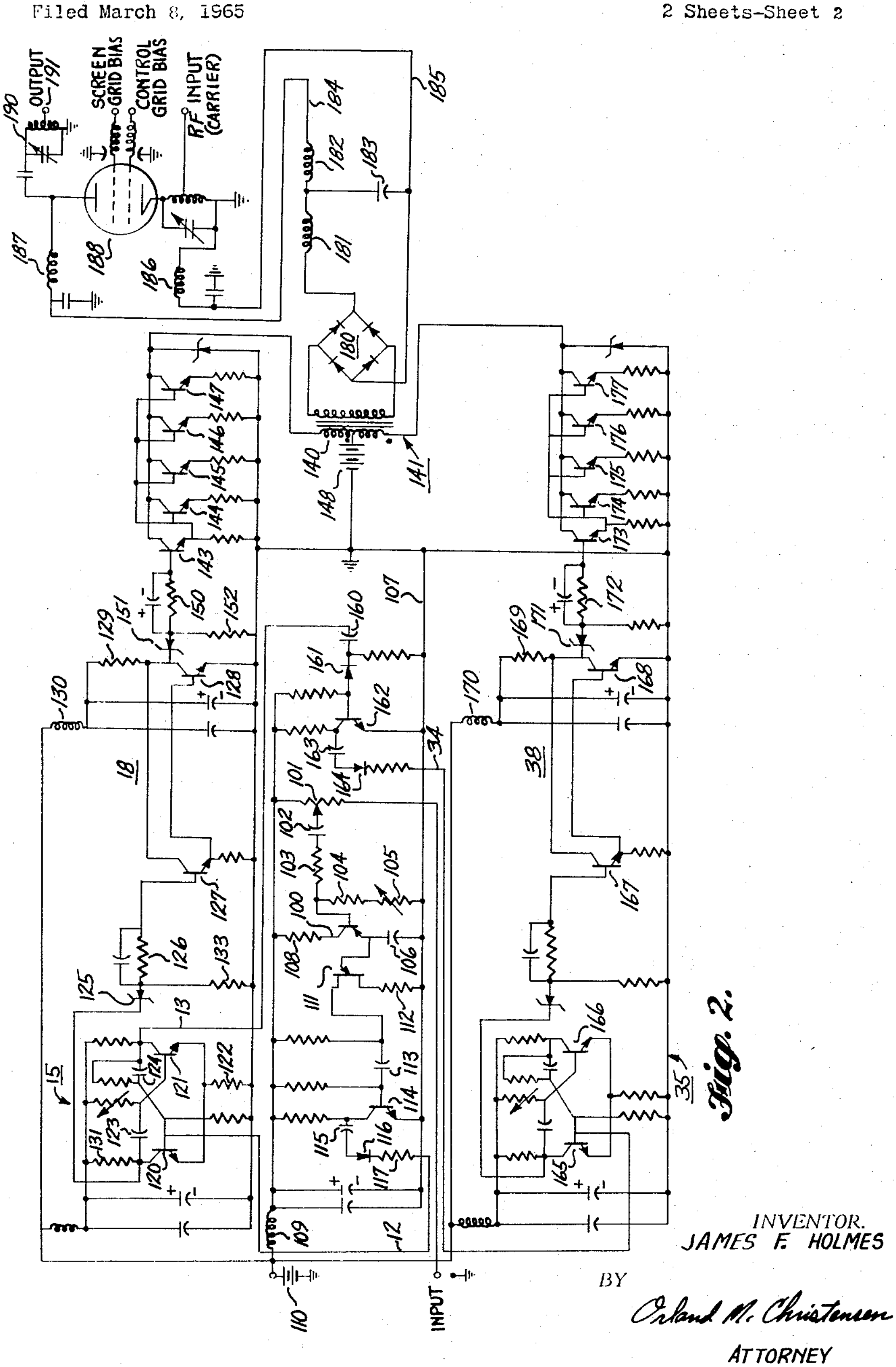

The above as well as additional advantages and objects of the present invention will be more clearly understood from the following description when read with reference to the accompanying drawings and wherein, FIGURE 1 is a block diagram illustrating in system form a preferred embodiment of the present invention, and FIGURE 2 is a schematic circuit diagram showing in greater detail the specific circuit connections and various components which can be utilized in accordance with the system concepts of FIGURE 1 for carrying out the present invention and obtaining the advantages thereof.

Referring now to the drawings and in particular to FIGURE 1, there is shown for purposes of illustration a preferred embodiment of the present invention which is particularly adapted for generating amplitude modulated high-frequency output signals in response to applied information signals. An input circuit 10 is coupled with an amplitude-to-frequency converter 11 which in turn has a signal output circuit 12 coupled with a trigger or pulse generating circuit 13. The trigger circuit 13 has a signal output circuit 14 coupled to the input of a first mono-stable multivibrator or pulse generator 15 and is adapted to apply a suitable trigger signal 16 to the mono-stable pulse generator 15. When the mono-stable circuit 15 is thusly triggered by the signal 16, it provides an output pulse 17 generally of rectangular form and of a width $T_F$. The time constant of the mono-stable circuit is so adjusted that the width of the pulse 17 is fixed and of a time duration less than one-half of the time required for a complete cycle of the FM signal applied to the trigger circuit 13 when said FM signal is at its highest frequency.

The signal 17 from pulse generator 15 is applied to a pulse amplifier 18 having an output circuit 19 coupled with a power switch and transformer 20. The power switch and transformer 20 increases the voltage of the signals applied thereto so that a high voltage signal 22 in the output circuit 23 thereof will be provided to a suitable rectifier network 24. The rectifier circuit 24 has its output circuit 25 coupled with a filter network 26. It will be seen that the filter network 26 is provided with high power pulses 27 which are of constant time duration and separated from each other by a time which is proportional to and controlled by the frequency of the FM signal applied to trigger circuit 13 and therefore the filter network 26 provides an output signal 28 which is essentially an amplitude modulated high-level DC signal.

To increase the output power and provide an asymmetrical system the preferred embodiment of the present invention shown in FIGURE 1 may include a second mono-stable multivibrator or pulse generator 35 having its signal input circuit 34 coupled to the trigger circuits, 13. The first mono-stable pulse generator 15 has an output circuit 29 over which a signal 30 is applied to the trigger circuits 13 in response to termination of the signal 17 from pulse generator 15. The trigger circuits 13 respond to signal 30 and apply a signal 36 to the second pulse generator 35 which then provides an output pulse 37. The pulse 37 is similar to the pulse 17 in that it is of the same constant time duration $T_F$ and is substantially rectangular. The signal 37 is applied to a second pulse amplifier 38 having its signal output circuit 39 coupled with the power switch and transformer 20 so that its amplified output signals 40 will be applied to the power switch and transformer 20 and give rise to the output signals shown generally at 42 in the signal output circuit 23 of the power switch and transformer 20. The signals 42 are rectified and inverted so that a second signal 47 immediately adjacent to the first signal 27 will be provided in the output circuit 25 of rectifier network 24. Thus a relatively smooth amplitude modulated signal 28 is provided from the filter network 26.

The high-power direct current and amplitude modulated signal 28 is applied to a suitable radio frequency (RF) output stage 50 which simultaneously has applied thereto a radio frequency carrier signal from an RF source 51. The signal 28 applied to the RF output stage 50 provides the necessary power for operation of the output stage and simultaneously provides the modulation information thereto so that no separate DC power supply, modulation transformer or associated modulation amplifier is required for driving the RF output stage. The result is that a modulated RF output signal is provided in an efficient manner by the output stage 50 and with a substantial saving in space and weight being accomplished.

In the absence of a modulation signal the frequency of the signal provided by the converter 11 to the trigger circuit 13 remains constant so that a train of pulses at a repetition frequency $f_0$ will be provided by the trigger circuit 13 to the first mono-stable pulse generator 15. When the resulting pulse 17 from the mono-stable pulse generator 15 terminates, the first pulse generator 17 provides a pulse 30 for the trigger circuit 13 which triggers the second mono-stable pulse generator 35. Thus a second pulse 37 will be positioned in time immediately adjacent to the first pulse 17. As a result of the previously described operation of the power switch and transformer and associated rectifier network 24, a series of pulses 27 and 47 will be applied to the filter network 26 at a repetition frequency $f_0$.

When a modulation signal is present at the input circuit 10 to the converter 11 the frequency of the signal from the converter (or frequency generator) 11 will be varied in proportion to the amplitude of the modulating signal applied thereto. Therefore the repetition rate of the trigger signals 16 applied to circuit 15 will vary in accordance with the amplitude of the input signals at terminal 10. Since the pulses 21 and 40 applied to the power switch and transformer 20 are of constant width and occur at a repetition rate proportional to the amplitude of the input signals, the average value of the output signal from the filter network 26 will also vary in accordance with variations in the input signal. Thus the output 28 is essentially a high level DC voltage the amplitude of which is modulated in accordance with the modulation information applied to the input 10 so that sufficient DC power is provided for operation of the RF output stage 50. The modulation carried by the power applied to the output stage 50 then modulates the RF signal from the source 51 and hence amplitude modulated radio frequency output signals are provided. Thus a compact system is achieved in that various components are eliminated since the operating power for the output stage carries the modulation information. In addition it is found that a significant improvement in over-all efficiency is obtained.

Referring now to FIGURE 2, there is shown with greater particularity the details of one specific preferred embodiment of the present invention utilized for generating high energy ultra high frequency (UHF) amplitude modulated output signals. Input amplitude modulated signals, as for example audio signals, are applied by the signal input circuit 10 to the base of a first transistor 100 through a variable resistor 101, a capacitor 102 and the resistor network including resistors 103, 104 and 105. The emitter of the transistor 100 is coupled by a capacitor 106 to a point of reference potential 107 referred to hereinafter as common signal ground, while the collector of transistor 100 is coupled through a resistor 108 and an inductor 109 to the positive terminal of a low voltage power supply 110 having its negative terminal connected to signal ground. The emitter of transistor 100 is also connected to the emitter of a uni-junction, transistor 111, which in turn has its first base connected through resistor 112 to signal ground and its second base connected through capacitor 113 to the base of an NPN transistor 114 which is part of a first trigger circuit. The second base of the uni-junction transistor 111 is resistively connected to the positive terminal of the first DC power supply 110 so that operating potential is applied thereto. The uni-junction transistor 111 and the first transistor 100 together act as an amplitude-to-frequency converter with the transistor 100 and capacitor 106 acting as a variable RC circuit for the emitter of the uni-junction transistor so that the uni-junction transistor is gated on and off at a rate which is proportional to the amplitude of the signal applied to the base of the PNP transistor 100.

The variable frequency signals from the uni-junction transistor 111 serve to repeatedly turn the NPN transistor 114 off so that positive pulses will be provided through the capacitor 115, diode 116, and resistor 117 over the lead 12 to the base of a first transistor 120 of the first mono-stable pulse generator 15. The first mono-stable pulse generator 15 includes a second NPN transistor 121. The emitters of transistors 120 and 121 are connected to signal ground through the common emitter resistor 122 and the bases are cross-coupled with the respective collectors by capacitors 123 and 124 which together with the indicated conventional bias resistors cause the transistor 121 to be normally conductive and the transistor 120 to be normally nonconductive. The time constants are so adjusted that when a positive pulse is provided from the trigger circuit including transistor 114 to the base of transistor 120, the transistor 120 becomes conductive and the transistor 121 becomes nonconductive for a preselected constant time interval $T_F$. The collector of transistor 120 is connected through the Zener diode 125 and resistor 126 to the base of an NPN transistor 127 which is the first stage of a two stage pulse amplifier which includes a second NPN transistor 128. It will be seen that the collectors of the transistors 127 and 128 are connected through a common resistor 129 and inductor 130 to the source of positive potential provided by battery 110. The emitter of transistor 127 will be seen to be directly connected to the base of transistor 128, the circuit arrangement being such that when the transistor 120 is nonconductive transistors 127 and 128 are conductive and when the transistor 120 is conductive the transistors 127 and 128 are nonconductive. With the transistor 120 normally nonconductive, sufficient bias current will flow through its collector resistor 131, the Zener diode 125, and the resistor 133 connected between ground and the anode of diode 125 to maintain the base of transistor 127 sufficiently positive to cause transistors 127 and 128 to be normally conductive. When the transistor 120 is rendered conductive by a pulse from the trigger circuit the Zener diode 125 will become nonconductive and hence transistors 127 and 128 will become nonconductive.

While various types of power switches can be used for driving the primary of an output transformer 141, the system shown in FIGURE 2 makes use of 5 NPN transistors 143–147 connected in parallel circuit arrangement between the transformer primary winding 140 and signal ground. The transformer primary 140 is provided with a center tap which is connected to the positive terminal of a power supply shown as a battery 148 having its negative terminal grounded. The conductive state of the transistors 143–147 thus serves to control the flow of current from the battery 148 through one-half of the primary winding 140. The state of conduction of transistors 143–147 is controlled by the transistors 127 and 128 since the base of transistor 143 is connected through a resistor 150 and Zener diode 151 to the collector of transistor 128. The collector resistor 129 of transistor 128, the Zener diode 151, and a resistor 152 act as a bias network for the base of transistor 143 with the arrangement being such that when transistor 128 is conductive the base of transistor 143 is effectively grounded and hence transistors 143–147 are maintained nonconductive. When the transistor 128 becomes nonconductive in response to an output pulse from the first mono-stable pulse generator, it will be seen that the transistors 143–147 become conductive and hence substantial current flows in the primary winding 140.

While the circuit components thus far described can be utilized for driving the output transformer 141 to obtain high voltage signals having sufficient power for driving the RF output stage described hereinafter, the preferred embodiment of the invention illustrated schematically in FIGURE 2 further includes a second mono-stable pulse generator and associated pulse amplifier for driving the other half of the primary winding 140 to obtain an asymmetrical output signal and hence provide increased power. Thus it will be seen that the collector of the transistor 121 in the first mono-stable multivibrator is coupled by the lead 13 through a capacitor 160 and diode 161 to the base of an NPN transistor 162 connected in a second trigger circuit similar to the trigger circuit which includes the NPN transistor 114 previously described. When the first mono-stable pulse generator reverts to its stable condition with transistor 121 being conductive, the change of voltage on the collector of transistor 121 is coupled by capacitor 160 and diode 161 to the base of transistor 162 resulting in a positive output pulse from the collector of transistor 162. The capacitor 163 and diode 164 serve to apply this pulse over the lead 34 to the second mono-stable pulse generator 35 which includes transistors 165 and 166. The second mono-stable pulse generator which includes transistors 165 and 166 is substantially identical to the first mono-stable pulse generator described above, transistor 166 being the normally conductive transistor in the second mono-stable circuit. Transistors 167 and 168 provide a two stage pulse amplifier which operates in the same manner as the previously described pulse amplifier which includes transistors 127 and 128. It will be seen that the collector of transistor 168 is coupled through the resistor 169 and inductor 170 to the positive terminal of voltage source 110 as well as through the Zener diode 171 and resistor 172 to the base of the first of five power switching transistors 173–177. The emitter-collector circuits of transistors 173–177 are connected in parallel with each other, with each being in series circuit between the primary winding 140 of transformer 141 and signal ground. The second mono-stable pulse generator, pulse amplifier, and power switch operate in a manner substantially identical to the manner of operation of the first-described mono-stable circuit, pulse amplifier, and power switch. The arrangement is such that when the first mono-stable pulse generator reverts to its stable condition the trigger circuit including transistor 162 will respond thereto and apply an appropriate positive pulse to the base of transistor 165 to trigger the second mono-stable circuit to its unstable condition. The result is that an asymmetrical pulse amplification system is provided for the switching of a heavy current through the primary winding of the output transformer 141. It should be noted that the power switching arrangement provided by the two groups of parallel transistors each including five heavy current capability transistors makes possible the switching of relatively heavy currents in a pulse mode through the transformer primary giving rise to a large *dI/dt* and hence a high voltage can be produced in the transformer secondary winding 142.

From the above it will be seen that the occurrence of the pulses of heavy current through the transformer primary winding will be controlled by and proportional to the amplitude of the input signal applied to input lead 10 and therefore if a suitable rectifier and filter network is coupled with the secondary winding of the transformer 141 a high voltage amplitude modulated direct current signal will be obtained. To this end a full wave rectifier circuit 180 including four diodes connected in conventional circuit arrangement serves to rectify the output voltage from the transformer secondary winding 142 and apply the same to a filter network which includes inductors 181, 182 and the capacitor 183 having values selected such that the network acts as low-pass filter. As a result, an amplitude modulated high voltage signal is provided at the signal output leads 184 and 185 so that signal can be applied through the RF chokes 186 and 187 to an appropriate high power RF output stage which is shown for purposes of illustration as a tetrode 188.

It will be seen that the high voltage leads 184 and 185 are respectively coupled through the chokes 186 and 187 to the plate and cathode of the tetrode 188 so that the necessary operating voltage for the output stage is provided to the tetrode 188 and simultaneously the tetrode is provided with plate modulation. As is common in the part, the tetrode is provided with screen grid bias and control grid bias for proper operation as the high power RF output stage. A suitable RF carrier signal is applied to the RF carrier input terminal 189 which is connected to the tuned LC circuit connected to the cathode of tetrode 188. A tuned circuit 190 will also be seen to be connected between the plate of the tetrode 188 and the signal output circuit indicated generally by the lead 191.

There has thus been described an improved radio frequency transmitter which makes use of high gain pulse amplification techniques for providing to an output stage the required high voltage for operation of the output stage and simultaneously the desirable plate modulation information thereto. Thus the high voltage power supply and other associated equipment normally required for efficient operation of the output stage of a radio frequency transmiter are eliminated. The result is that an improved system is provided which is found to be efficient and of substantially reduced physical size as compared to prior art transmitters of this type. While the output stage has been shown for purposes of illustration as including a conventional tetrode it will of course be obvious to those skilled in the art that solid state components can be utilized to further reduce the physical size of the system. When a solid state output stage is used the step-up transformer is not required, and in one such system using a solid state RF output the components for the second wave train were eliminated. The over-all system efficiency still remained above 80% up to the leads 184–185.

In one system constructed in accordance with the teachings of the present invention and following generally the teachings of FIGURE 2, an over-all efficiency improvement of approximately 30% was obtained as compared to prior art systems. In that particular system the voltage sources 110 and 148 were thirty volts and fifty volts respectively and a type 7650 tetrode was used in the output stage.

The invention has been described with reference to a particular preferred embodiment thereof making use of pulse spacing modulation techniques. Pulse width modulation can also be used with the width of each pulse being proportional to the desired intelligence rather than the separation between adjacent pulses. The use of the pulse spacing system, however, provides additional advantages in terms of simplification of the pulse circuitry and output transformer design. It is intended that those modifications and changes which will become obvious to a person skilled in the art as a result of the teachings hereof will be encompassed by the following claims.

I claim as my invention:

1. A combination power supply and modulation system comprising in combination: signal input circuit means for receiving applied signals carrying intelligence information; pulse generator means coupled with said signal input circuit means and providing a series of power pulses each having substantially the same constant time duration with each pulse displaced from the immediately preceding pulse by a length of time proportional to said intelligence information; output signal transmission means; and means including a filter network connected to said pulse generator means and to said transmission means adapted to provide modulated operational power from said generator means to said transmission means.

2. A system as defined in claim 1 wherein said pulse generator means includes a trigger circuit adapted to provide a train of trigger signals separated in time in accordance with the intelligence information of said applied signals, a first monostable multivibrator coupled with said trigger circuit and adapted to switch to its unstable condition for a constant time duration in response to each of said trigger signals, and pulse amplifier and power switching means coupled with said multivibrator and responsive thereto for providing high energy signals to said filter network.

3. A system as defined in claim 2 and including a second monostable multivibrator coupled with said first monostable multivibrator and responsive to return of said first multivibrator to its stable condition to change to its unstable condition for a constant time duration, and wherein said pulse amplifier and switching means includes first and second amplifier circuit means and a transformer having a primary winding coupled to each of said amplifier circuit means and a secondary winding coupled with said filter network.

4. A system as defined in claim 2 wherein said signal input circuit means includes amplitude-to-frequency signal conversion means coupled with said trigger circuit.

5. A radio frequency transmission system comprising in combination: trigger circuit means responsive to applied information signals to provide a series of trigger signals separated in time in proportion to the modulation of said information signals applied thereto; first and second monostable pulse generators each responsive to an applied control signal to change to an unstable condition for a constant time interval and to then revert to its stable condition; circuit means coupling said trigger circuit means with said first monostable pulse generator for coupling said trigger signals to said first monostable pulse generator as control signals; circuit means coupling said second monostable pulse generator with said first monostable pulse generator for coupling a control signal to said second monostable pulse generator each time said first monostable pulse generator reverts to its stable condition; power switching and pulse amplifier means coupled with said first and second monostable pulse generators for providing high voltage output signals each having substantially identical waveshape, each lasting for the same constant time, and each spaced from a preceding output signal by a time equal to the time between reversion of said second monostable pulse generator to its stable condition and the triggering of said first monostable pulse generator to its said unstable condition; a radio frequency transmitter having first signal input circuit means for the application of carrier frequency energy thereto and second signal and power input circuit means for the application of operating power and modulation information thereto; and circuit means coupling the output of said power switching and pulse amplifier means to the said second signal and power input circuit means of said radio frequency transmitter for applying simultaneously to said radio frequency transmitter operating power and modulation information.

6. A radio frequency transmission system as defined in claim 5 wherein said last named circuit means coupling the output of said pulse switching and amplifier means to said radio frequency transmitter includes rectifier and filter circuit means.

7. A radio frequency transmission system as defined in claim 5 and including amplitude-to-frequency signal conversion means coupled to the input of said trigger circuit means.

8. A DC power supply and amplitude modulator comprising in combination: Signal input circuit means for receiving applied information signals; pulse generation and amplification means adapted to generate a series of substantially rectangular power pulses; pulse modulation and control means connected to said signal input circuit means and to said pulse generation and amplification means for modulating said series of pulses in accordance with the modulation of the signals applied to said signal input circuit means; and rectifier and filter network means coupled with the output of said pulse generation and amplification means and providing amplitude modulated direct current output signals in response to said series of power pulses.

9. An amplitude modulated radio frequency transmitter system comprising in combination: Signal input circuit means for receiving applied information signals; pulse generation and amplification means adapted to generate a series of substantially rectangular power pulses; pulse modulation and control means connected to said signal input circuit means and to said pulse generation and amplification means for modulating said series of pulses in accordance with the modulation of the signals applied to said signal input circuit means; rectifier and filter network means coupled with the output of said pulse generation and amplification means and providing amplitude modulated direct current output signals in response to said series of power pulses; radio frequency transmitter means having a first input circuit for receiving amplitude modulated operating power and a second input circuit for receiving carrier frequency signals; and circuit means coupling said rectifier and filter network means to said first input circuit of said radio frequency transmitter means.

References Cited

UNITED STATES PATENTS

| | | | |
|---|---|---|---|
| 3,040,271 | 6/1962 | Murphy | 325—492 XR |
| 3,102,234 | 8/1963 | Eisenberg | 325—104 |

ROBERT L. GRIFFIN, *Primary Examiner.*

W. E. COOK, *Assistant Examiner.*